(12) United States Patent
Fukada et al.

(10) Patent No.: US 6,696,134 B2
(45) Date of Patent: Feb. 24, 2004

(54) BLOWN FILMS AND A METHOD FOR PRODUCING THE SAME

(75) Inventors: Masanori Fukada, Ichihara (JP); Tatsuya Kasahara, Sodegaura (JP)

(73) Assignee: Sumitomo Chemical Company, Limited, Osaka (JP)

(*) Notice: Subject to any disclaimer, the term of this patent is extended or adjusted under 35 U.S.C. 154(b) by 19 days.

(21) Appl. No.: 09/986,980

(22) Filed: Nov. 13, 2001

(65) Prior Publication Data

US 2002/0086139 A1 Jul. 4, 2002

(30) Foreign Application Priority Data

Nov. 13, 2000 (JP) ........................................ 2000-344978

(51) Int. Cl.$^7$ .............................. B32B 5/27; B29C 9/00
(52) U.S. Cl. ....................... 428/141; 428/516; 428/523; 264/514; 264/564; 264/291
(58) Field of Search ................................ 428/141, 516, 428/523; 264/514, 564, 291

(56) References Cited

U.S. PATENT DOCUMENTS

| | | |
|---|---|---|
| 4,205,021 A | 5/1980 | Morita et al. |
| 5,310,584 A | 5/1994 | Jacoby et al. |
| 6,023,921 A * | 2/2000 | Burns et al. ................. 56/16.3 |

FOREIGN PATENT DOCUMENTS

| | | |
|---|---|---|
| GB | 1 542 671 | 3/1979 |
| JP | 58-55222 A | 4/1983 |
| JP | 60-262625 A | 12/1985 |
| JP | 6-80794 A | 3/1994 |
| JP | 6-322152 A | 11/1994 |
| JP | 10-323948 A | 12/1998 |
| JP | 11-10811 A | 1/1999 |

* cited by examiner

Primary Examiner—William P. Watkins III
(74) Attorney, Agent, or Firm—Fitch Even Tabin & Flannery

(57) ABSTRACT

An objective of the invention is to provide a blown film which is excellent in terms of the optical characteristics, the tear strength and the rigidity as well as a method for producing the same, and the present invention provides a blown film whose surface morphology is a spherulite structure in which spherulites having diameters of about 3 $\mu$m or more exist and whose surface mean roughness Ra is about 30 nm or less as well as a method for producing the same.

6 Claims, No Drawings

BLOWN FILMS AND A METHOD FOR PRODUCING THE SAME

FIELD OF INVENTION

The present invention relates to a blown film whose optical characteristics, tear strength and rigidity are well-balanced.

BACKGROUND OF THE INVENTION

A blown film is employed widely for packaging since it enables a film production at a high productivity with simple equipment. Such a blown film should have, for example, an optical property (transparency or gloss), tear strength and rigidity. In response to a trend of demanding a thinner film, a film having excellent tear resistance and rigidity is required.

While a blown film made of a low density polyethylene (LDPE) by a high pressure radical polymerization process has excellent optical characteristics, it has a poor tear resistance. On the other hand, while a blown film made of a linear low density polyethylene (LLDPE) which is a copolymer of ethylene and an a-olefin has excellent tear strength, it has poor optical characteristics. The optical characteristics are usually improved by blending 10 to 30% of LDPE with LLDPE, but the tear strength of the film thus obtained is deteriorated.

The rigidity of a film made of LLDPE or LDPE is related with the density, and a higher density usually gives a higher rigidity, but is accompanied with a deterioration of the optical characteristics and a reduction in the tear strength, thus to obtain a satisfactory rigidity of a film simultaneously with satisfactory optical characteristics and tear strength is difficult.

SUMMARY OF THE INVENTION

An objective of the present invention is to provide a blown film which is excellent in terms of the optical characteristics, the tear strength and the rigidity, as well as a method for producing the same.

The present invention is directed to a blown film whose surface morphology is a spherulite structure in which spherulites having diameters of about 3 $\mu$m or more exist and whose surface average roughness Ra is about 30 nm or less, as well as a method for producing the same.

This invention is further detailed below.

DETAILED DESCRIPTION OF THE INVENTION

The surface morphology of a film according to the present invention is a spherulite structure. When the surface morphology of a film is an oriented structure such as a raw structure, the tear strength in the direction of the orientation is reduced. A spherulite structure means a crystalline structure resulted from a spherical symmetrical growth from the center, which is a crystal nucleus, in the course of the crystallization of a resin (a contact with an adjacent spherulite during the crystal growth may lead to a polyhedron-like final spherulite structure). Since when such spherulite structure appears on the surface of a film, a round protrusion (uneven surface) is formed. Thus, the surface morphology of the film can be observed for example by an atomic force microscope, and it can be verified that the surface morphology of the film is a spherulite structure.

In the surface morphology of a film according to the invention, spherulites having diameters of about 3 $\mu$m or more exist.

While the expression "spherulites having diameters of about 3 $\mu$m or more exist" means the condition in which spherulites having diameters of about 3 $\mu$m or more exist, it is also acceptable that at least one spherulite having a diameter of about 3 $\mu$m or more exists within an about 100 $\mu$m×about 100 $\mu$m vision of an atomic force microscope as described below since the surface of a film usually undergoes an almost even cooling. The number of such spherulites is preferably about 100 to about 1000, more preferably about 300 to about 1000 for the purpose of obtaining satisfactory tear strength. While the number of visions to be observed may be one, it is usually preferable to observed several visions. The upper limit of the diameter is not limited particularly, but is usually about 10 $\mu$m or less.

When the final spherulite structure is a polyhedron as described above, the longest diameter of a polyhedron may be determined as a diameter.

The surface average roughness Ra of a film of the present invention is about 30 nm or less. A smaller average roughness Ra is more preferable in view of the transparency, and more preferably the Ra is about 27 nm or less.

A surface average roughness Ra of a film here means a value obtained by determining the unevenness of the surface of the film when determined by an atomic force microscope.

A blown film whose surface morphology satisfies the condition described above may for example be a blown film which is a multilayer film having three or more layers and whose both surface layers are made from Resin 1 described below and at least one of whose middle layers is made from Resin 2 described below.

(Resin 1) A linear low density polyethylene obtained by a polymerization using a single site catalyst (Resin 2) A thermoplastic resin whose crystallization temperature is higher by about 2° C. or more than that of Resin 1 described above Resin 2 is preferably a linear thermoplastic resin, more preferably a linear low density polyethylene in view of a well-balanced optical characteristics, tear strength and rigidity.

A single site catalyst is a catalyst capable of forming uniform active species, and prepared usually by contacting a metallocene-based transition metal compound or a non-metallocene-based transition metal compound with an activating promoter.

By using a linear low density polyethylene obtained by a polymerization using a single site catalyst described above, a film of the invention can exhibit a favorable excellent tear strength (especially in an MD direction).

A single site catalyst may for example be a catalyst prepared by contacting a metallocene-based transition metal compound with an activating promoter, more preferably a catalyst prepared by bringing a metallocene-based transition metal compound represented by Formula MLaXn-a (wherein M denotes the 4th or lanthanoid transition metal atom on the IUPAC periodic table, L denotes a group having a cyclopentadiene-type anion backbone or a group having a heteroatom, and at least one is a cyclopentadiene-type anion backbone, several Ls may be crosslinked, X denotes a halogen atom, a hydrogen atom or a hydrocarbon group having 1 to 20 carbon atoms, n denotes the atomic valency of the transition metal atom M and a is an integer which satisfies 0<a≦n) with an activating promoter, and said transition metal compound may be employed alone or in combination one or more of such metals. An activating promoter may for example be one capable of giving an olefin polymerization activity by being employed together with a metallocene-based transition metal compound or a non-metallocene-based transition metal compound, such as an organic aluminium compound containing an alumoxane compound and/or a boron compound such as triphenylmethyl tetrakis (pentafluorophenyl) borate, N,N-dimethylanilinium tetrakis(pentafluorophenyl) borate and the like. As a single site catalyst a combination of particulate carriers including an inorganic carrier such as $SiO_2$ and $Al_2O_3$ and an organic polymer carrier such as polymers of ethylene and styrene.

A linear low density polyethylene means a copolymer of ethylene with an α-olefin having 3 to 12 carbon atoms and having a polyethylene crystalline structure. An α-olefin having 3 to 12 carbon atoms may for example be propylene, butene-1, 4-methylpentene-1, hexene-1, octene-1, decene-1 and the like. In view of the tear strength, 4-methylpentene-1, hexene-1, octene-2 and decene-1 are especially preferred.

The MFR value of Resin I described above is preferably 0.1 g/10 minutes or more for the purpose of reducing the load onto an extruder, more preferably 0.5 g/10 minutes or more. Also in view of the bubble stability during a blown film extrusion, and the tear strength and the blocking of the obtained film, a MFR value not higher than 50 g/10 minutes, especially, 10 g/10 minutes, is more preferred. An MFR value here means a value determined by the method prescribed in JIS-K 7210.

The density of Resin 1 described above is preferably at least 880 kg/m$^3$, more preferably at least 900 kg/m$^3$ in view of the bubble stability during a blown film extrusion. Also in view of the optical characteristics and the tear strength of a resultant film, the density is preferably 937 kg/m$^3$ or less, more preferably 925 kg/M$^3$ or less. A density here means a value determined by the method prescribed in JIS-K 6760-1981.

Resin 2 described above is a thermoplastic resin whose crystallization temperature is higher by about 2° C. or more than that of Resin 1 described above, more preferably by about 4° C. or more in view of the optical characteristics of a resultant film. A higher crystallization temperature of Resin 2 than that of Resin 1 gives a smaller unevenness of the film surface, which leads to more satisfactory optical characteristics and rigidity. While the upper limit is not limited particularly, it is usually higher by about 20° C. Resin 1 on one side may differ from that on the other side, and in such case the criteria of the crystallization temperature of Resin 2 is on the basis of Resin 1 having the higher crystallization temperature.

The density of Resin 2 described above is preferably at least 900 kg/m$^3$, more preferably at least 920 kg/m$^3$ in view of the bubble stability during a blown film extrusion. Also in view of the optical characteristics and the tear strength of a resultant film, the density is preferably 940 kg/m$^3$ or less, more preferably 935 kg/m$^3$ or less.

Resin 2 is preferably a linear thermoplastic resin in view of a well-balanced optical characteristics, tear strength and rigidity. The linear resin is a resin without any long chain branching, and a linear low density polyethylene is more preferred.

Especially in view of the tear strength of a film, a linear low density polyethylene obtained by polymerization using a single site catalyst described above is more preferred.

With regard to the relationship between the MFR values of Resins 1 and 2, the MFR value of Resin 2 is equal to or less than that of Resin 1, in view of the appearance of a resultant film. When the MFR value of one side of the both surface layers is different from that of the other, the lower MFR value serves as a basis.

While the layer ratio of a multilayer film is not limited particularly, the surface layer: the middle layer is preferably 4:1 to 1:4 in view of the productivity and the balance between the physical characteristics. When two or more middle layers are present, it is acceptable that each middle layer is within the range specified above.

A blown film according to the present invention can be produced by forming both surface layers by using Resin 1 described above, forming at least one of the middle layers by using Resin 2 described above, and processing a film by an air-cooled blown film extrusion.

The processing conditions usually involve a processing temperature of about 140 to about 220° C., a blow up ratio of about 1.5 to about 5.0, a take up speed of about 5 to about 150 m/min and a thickness of about 10 to about 200 μm.

EXAMPLES

The present invention is further detailed below referring to Examples.

Each parameter was determined as described below.
(a) Average roughness Ra of Film Surface (Unit: nm)
Sampling The surface of a film was rinsed with acetone for 1 minute and then fixed on a sample mount using a double adhesive tape. Subsequently, the sample was made free of static sufficiently using a static remover (*DYNAC* PB-160B manufactured by *FISA*).
Measurement An atomic force microscope (AFM) was employed to measure the unevenness of the surface of a sample (measured vision: 100 μm×100 μm)
Observation conditions
Observation unit: Model D3000 large scale sample observation system Manufactured by Digital Instrument
Controlling unit: NanoScope IIIa (Manufactured by Digital Instruments: Ver.4.23 rl)
Measurement mode: Tapping
Data type: Height
Scan rate: 0.5 to 1 Hz
Number of lines: 512 lines
Number of data points: 512 points/line
Slope correction: Slope correction was performed using "Real time Planefit" function (Line).
Probe employed
Name: TESP (Manufactured by Nanosensors)
Material: Si single crystal
Cantilever shape: Single beam type
Cantilever spring constant: 21 to 78 N/m
Probe tip curvature radius: 5 to 20 nm
Probe length: 10 to 15 μm
Probe ½ cone angle: About 18 degrees
Data Processing The "Flatten" function (Order 1) of the AFM controlling software was employed to correct for a curve and to remove a noise.

An image after curve correction and noise removal was subjected to a calculation of the average roughness Ra of a film surface using the "Roughness" function of the AFM controlling software.
Software employed
Name: NanoScope IIIa (Digital Instruments; Ver.4.23 rl)
(b) Surface Morphology A surface morphology was evaluated on the basis of the image obtained in the Ra measurement described above.

(c) Spherulite Size

The diameter of a spherulite was determined based on the image obtained in the Ra measurement described above. When the spherulite is a polyhedron, then the longest diameter was regarded as a diameter.

(d) Transparency: Evaluated on the Basis of a Haze (Unit: %). Typically, the Method Prescribed in JIS-K 7210 was Employed.

(e) Tear Strength (Unit: kN/m)

The method prescribed in JIS-K 7128 was employed.

(f) Rigidity: Evaluated on the Basis of a 1% Secant Modulus of Elasticity (Unit: MPa; Hereinafter Abbreviated as "1% SM").

Typically, a test piece whose width was 2 cm was cut out in the direction of the film processing (MD) or in the direction traverse thereto (TD) and fixed on the tensile tester with the inter-clip distance of 6 cm, and expanded at a speed of 5 mm/min to determine the stress at a 1% elongation, from which a 1% SM was calculated as 100×(stress)/(sectional area) [MPa].

(g) Crystallization Temperature (Unit:° C.)

A differential scanning calorimeter (DSC manufactured by Perkin Elmer) was employed to melting 10 mg of a sample by heating under nitrogen atmosphere at 150° C. for 4 minutes followed by cooling to 40° C. at a rate of 5° C./min. The temperature at which the maximum peak in a curve was observed was regarded as the crystallization temperature.

Example 1

By forming the both surface layers using SUMIKATHEN E FV403 which was a gas phase-produced metallocene-based ethylene-hexene-1 copolymer manufactured by Sumitomo Chemical Co., Ltd. (density=919 kg/m$^3$, MFR=4 g/10 minutes, Crystallization temperature=104° C.) and forming the middle layer using SUMIKATHEN E FV404 which was a gas phase-produced metallocene-based ethylene-hexene-1 copolymer manufactured by Sumitomo Chemical Co., Ltd. (density=927 kg/m$^3$, MFR=4 g10 minutes, Crystallization temperature=109° C.), a blown film was produced under the processing conditions specified below.

[1] Blown film processing machine: Coextrusion blown film line manufactured by PLACO Co., Ltd.
[2] Die: Three-kind three-layer coextrusion die, Die size: 150 mm ID, Lip gap: 2.0 mm
[3] Processing temperature: 150° C.
[4] Output: 40 Kg/hr
[5] Total thickness: 50 μm
[6] Blow up ratio: 2.2
[7] Winding speed: 14 m/min
[8] Layer ratio: Inner layer: middle layer: outer layer=1:2:1

Example 2

By forming the both surface layers using SUMIKATHEN E FV403 and forming the middle layer using SUMIKATHEN α FZ203-0 which was a multisite catalyst/high pressure ion-polymerized ethylene-hexene-1 copolymer manufactured by Sumitomo Chemical Co., Ltd. (density= 931 kg/m$^3$, MFR=2 g/10 minutes, Crystallization temperature=111° C.), a blown film was produced under the processing conditions similar to those in Example 1 except for the temperature 170° C. employed here as a processing temperature.

Comparative Example 1

By forming the both surface layers and the middle layer using SUMIKATHEN E FV403, a blown film was produced under the processing conditions similar to those in Example 1.

Comparative Example 2

By forming the both surface layers and the middle layer using a resin mixture obtained by dry-blending 80 parts by weight of SUMIKATHEN E FV403 and 20 parts by weight of SUMIKATHEN F200-0 which was a high pressure radical-polymerized low density polyethylene manufactured by Sumitomo Chemical Co., Ltd. (density=923 kg/m$^3$, MFR=2 g/10 minutes), a blown film was produced under the processing conditions similar to those in Example 1.

Comparative Example 3

By forming the both surface layers using SUMIKATHEN E FV403 and forming the middle layer using SUMIKATHEN E FV402 which was a gas phase-produced metallocene-based ethylene-hexene-1 copolymer manufactured by Sumitomo Chemical Co., Ltd. (density=915 kg/m$^3$, MFR=4 g/10 minutes, Crystallization temperature=104° C.), a blown film was produced under the processing conditions similar to those in Example 1.

Comparative Example 4

By forming the both surface layers using SUMIKATHEN α FZ202-0 which was a multisite catalyst/high pressure ion-polymerized ethylene-hexene-1 copolymer manufactured by Sumitomo Chemical Co., Ltd. (density=921 kg/m$^3$, MFR=2 g/10 minutes, Crystallization temperature=106° C.) forming the middle layer using SUMIKATHEN α FZ203-0, a blown film was produced under the processing conditions similar to those in Example 1 except for the temperature 170° C. employed here as a processing temperature.

The results of the evaluation of each film obtained are shown in Table. 1.

TABLE 1

|  | Example 1 | Example 2 | Comparative Example 1 | Comparative Example 2 | Comparative Example 3 | Comparative Example 4 |
| --- | --- | --- | --- | --- | --- | --- |
| Surface morphology | Spherulite | Spherulite | Spherulite | Raw structure | Spherulite | Raw structure |
| Spherulite of 3 μm or more | Present | Present | Present | — | Present | Absent |
| Average roughness Ra(nm) | 24 | 19 | 71 | 29 | 71 | 17 |
| Haze (%) | 11.5 | 8.8 | 33.6 | 8.1 | 27.0 | 8.1 |
| Tear strength(MD) (kN/m) | 165 | 108 | 141 | 83 | 128 | 47 |

TABLE 1-continued

| | Example 1 | Example 2 | Comparative Example 1 | Comparative Example 2 | Comparative Example 3 | Comparative Example 4 |
|---|---|---|---|---|---|---|
| 1% SM(MD) (MPa) | 214 | 241 | 179 | 173 | 160 | 257 |
| 1% SM(TD) (MPa) | 223 | 286 | 172 | 191 | 166 | 293 |

According to the invention, a blown film whose optical characteristics, tear strength and rigidity are excellent can be obtained.

What is claimed is:

1. A blown film having two opposing surface layers separated by one or more middle layers disposed therebetween, the film having a surface morphology which is a spherulite structure in which spherulites having diameters of about 3 μm or more exist and the film having a surface average roughness Ra of about 30 nm or less, wherein both surface layers comprise a linear low density polyethylene obtained by a polymerization using a single site catalyst and at least one of the middle layers comprises a thermoplastic resin whose crystallization temperature is higher by about 2° C. or more than that of said linear low density polyethylene.

2. The blown film according to claim 1, wherein the thermoplastic resin is a linear resin.

3. The blown film according to claim 2, wherein the linear thermoplastic resin is a linear low density polyethylene.

4. A method for producing a blown film having two opposing surface layers separated by one or more middle layers disposed therebetween, the film having a surface morphology which is a spherulite structure in which spherulites having diameters of about 3 μm or more exist and the film having a surface average roughness Ra of about 30 nm or less, the method comprising forming both surface layers by using a linear low density polyethylene obtained by a polymerization using a single site catalyst, forming at least one of the middle layers by using a thermoplastic resin whose crystallization temperature is higher by about 2° C. or more than that of said linear low density polyethylene, and processing a film by an air-cooling blown extrusion.

5. The method for producing a blown film according to claim 4 wherein the thermoplastic resin is a linear resin.

6. The method for producing a blown film according to claim 5 wherein the linear thermoplastic resin is a linear low density polyethylene.

* * * * *